United States Patent Office 3,562,214
Patented Feb. 9, 1971

3,562,214
RESINS BASED ON AROMATIC CYANIC ACID ESTERS AND POLYEPOXIDE COMPOUNDS
Rolf Kubens, Leverkusen, Heinz Schultheis, Cologne-Stammheim, Rudolf Wolf, Dusseldorf, Ernst Grigat and Hans-Dieter Schminke, Cologne-Stammheim, and Rolf Putter, Dusseldorf, Germany, assignors to Farbenfabriken Bayer Aktiengesellschaft, Leverkusen, Germany, a German corporation
No Drawing. Filed May 8, 1968, Ser. No. 727,695
Claims priority, application Germany, June 1, 1967,
F 52,573
Int. Cl. C08g 30/14
U.S. Cl. 260—47                     6 Claims

ABSTRACT OF THE DISCLOSURE

Synthetic resins based on aromatic cyanic acid esters having at least two cyanic acid ester groups per molecule and polyepoxides and process for producing the same.

---

This invention relates to new synthetic resins made from aromatic cyanic acid esters which have at least two cyanic acid ester groups per molecule and 1,2-epoxide compounds which have more than one epoxide group per molecule, and a process for the production of these synthetic resins.

A process for the production of synthetic resins has been found which is characterised in that epoxide compounds which have more than one epoxide group per molecule are reacted with aromatic cyanic acid esters which have at least two cyanic acid ester groups per molecule.

Of especial interest for the process according to the invention are aromatic di- and polyfunctional cyanic acid esters of the general formula $$R(O-C\equiv N)_n$$

in which $n$ is an integer equal to or greater than 2, preferably 2 to 6, and R is an aromatic radical which may be linked by bridge members. The cyanic acid group is always attached to an aromatic nucleus.

The aromatic radicals contain at least 6 carbon atoms, preferably 6 to 12 carbon atoms. They can be derived, for example, from benzene, naphthalene, anthracene, diphenyl etc.

The aromatic radical R which can be interrupted by bridge members has at least 12 carbon atoms and preferably 12 to 36 carbon atoms. It is built up from aromatic radicals (rings) which have at least 6 carbon atoms, preferably 6 carbon atoms. The bridge members may be atoms or radicals. The following are given as examples: —O—; —S—;

$$-\overset{O}{\underset{O}{\overset{\|}{S}}}-;\ -O-\overset{O}{\underset{O}{\overset{\|}{P}}}-O-;\ -O-\overset{\underset{|}{\phantom{O}}}{\underset{O}{\overset{\|}{P}}}-O-;\ -\overset{O}{\overset{\|}{C}}-;$$

$$\left(-\underset{R_2}{\overset{R_1}{\underset{|}{\overset{|}{C}}}}-\right)_n$$

in which $R_1$ and $R_2$ may be the same of different and denote hydrogen atoms of lower alkyl radicals with 1 to 4 carbon atoms and $n$ denotes an integer of between 1 and 6.

Furthermore the bridge member may be a cyclopentane or cyclohexane residue which may be substituted by lower alkyl groups having 1 to 4 carbon atoms;

$$CH_2-O-CH_2-;\ -\overset{O}{\overset{\|}{C}}-X-R-X-\overset{O}{\overset{\|}{C}}-$$

in which X may denote O, NH or NR' (R'=lower alkyl radical with 1 to 4 carbon atoms) and R may denote a hydrocarbon radical and, particularly when X=O, a radical of an aligoglycol or polyglycol or of a polyether, polyester of polyurethane, and in the case where X=NH or NR' it may denote a residue of a polyamine, polyamide or polyurea; the bridge member may denote $$\begin{array}{c}-\overset{O}{\overset{\|}{C}}\diagdown\phantom{xx}\diagup\overset{O}{\overset{\|}{C}}-\\ \phantom{xxx}N-Z-N\\ -\overset{O}{\overset{\|}{C}}\diagup\phantom{xx}\diagdown\overset{O}{\overset{\|}{C}}-\end{array}$$

in which Z may, for example, be $(-CH_2-)_{2-6}$,

—⟨⟩—⟨⟩—, —⟨⟩—C(CH₃)₂—⟨⟩—,

—⟨⟩—O—⟨⟩—

Further, the bridge member may also represent residues such as

[structures of bis-phthalimide type bridges]

The bridge members preferably denote the following:

$$-O-;\ -\overset{O}{\underset{O}{\overset{\|}{S}}}-;\ -O-\overset{O}{\underset{\underset{|}{\phantom{O}}}{\overset{\|}{P}}}-O-;\ -\overset{O}{\overset{\|}{C}}-;\ -CH_2-O-CH_2-\ \text{or}\ \left(-\underset{R_2}{\overset{R_1}{\underset{|}{\overset{|}{C}}}}-\right)_n$$

in which $R_1$, $R_2$ and $n$ have the meanings indicated above.

The aromatic radicals of the general formula $$R(O-C\equiv N)_n$$

may in addition carry substituents such as alkyl groups having 1 to 6 carbon atoms, cycloalkyl groups with 5 to 7 carbon atoms, aralkyl groups such as benzyl or phenyl ethyl, aryl groups such as phenyl or naphthyl, alkoxy groups with 1 to 6 carbon atoms in the alkyl radical, halogen atoms such as chlorine, bromine or fluorine, nitro groups, carboxylic acid ester groups, carboxylic acid amide, carboxylic acid nitrile or sulphonic acid ester groups. Preferably, aromatic cyanic acid esters which contain unsubstituted aromatic nuclei used.

Mixtures of the cyanic acid esters are quite suitable for the process according to the invention.

The following aromatic cyanic acid esters are given as particular examples: m- or p-phenylenebiscyanates; 1,3,5-tricyanatobenzene; 1,3- 1,4-, 1,5-, 1,6-, 1,7-, 1,8-, 2,6- and 2,7-dicyanatonaphthalenes; 1,3,6 - tricyanatonaphthalene; 4,4'-dicyanatodiphenyl; 2,2'-dicyanatodinaphthyl - (1,1); 2-methyl-1,4-dicyanatobenzene; 2-chloro-1,4-dicyanatobenzene; 2,3-dicyano-1,4-dicyanatobenzene; 4-chloro-1,3-dicyanatobenzene; 4-acetyl-1,3-dicyanatobenzene; 2-nitro-1,3-dicyanatobenzene; 3,5,3',5'-tetrachloro-2,2'-dicyanatodiphenyl; also bis- or polycyanatoquinones such as 1,4-dicyanato - naphthoquinone, 1,4- or 1,5-dicyanatoanthraquinones and also bis- or polycyanato compounds in which the aromatic radicals which carry the cyanate groups are connected by bridge members, such as 2,2'- or 3,3'- or 4,4'-dicyanatodiphenylmethanes; 4,4'-dicyanato-diphenylethane-(1,1)- or -(1,2); 2,2-bis- (4-cyanato-phenyl)-propane; 2,4-bis-(4-cyanatophenyl)-2-methylpentane; 1,1-bis-(4-cyanatophenyl)-cyclohexane; 4,4',4''-tricyanatotriphenylmethane; 4,4'-dicyanato-diphenyl ether; 4,4'-dicyanato-diphenylsulphide; 4,4'-dicyanato-diphenylsulphone; 4,4'-dicyanato-dibenzyl ether; 4,4'-dicyanato-dibenzyl-thioether; 2,2'-dicyanato-3,5-3',5'-tetramethyl-dibenzylether; 4,4'-dicyanato-benzophenone; 2,2-bis-(4-cyanato-3,5-dichlorophenyl)-propane and tri- (4-cyanato-phenyl)-phosphate.

Furthermore, those polycyanic acid esters which can be obtained from condensation products of phenols and aldehydes which are of ill-defined chemical constitution are suitable, and particularly those derived from formaldehyde. For example novolaks or phenol-modified xylene-formaldehyde resins, which are converted by reaction with cyanogen halides in the presence of a base in accordance with an earlier patent application of the applicants (see German patent specification No. 1,251,023) into suitable polycyanic esters. Also suitable are those bis-(or poly-) cyanic acid esters which are derivatives of bis-(or poly-) phenols of the formula given below and which can be obtained from them with cyanogen halides and base:

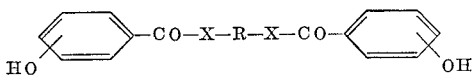

in which X denotes O, NH or NR' groups.

R denotes a hydrocarbon radical and, in the case where X=O, a radical of an oligo glycol or a polyglycol or of a polyether, polyester or polyurethane or, in the case where X=NH or NR', a polyamine, polyamide or polyurea radical. R' represents a lower alkyl radical.

The following compounds may also be mentioned:

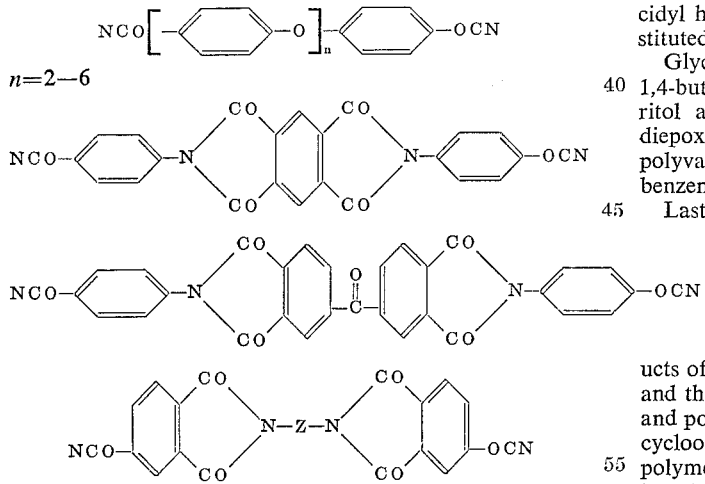

$n=2—6$ in which Z denotes e.g. the following:

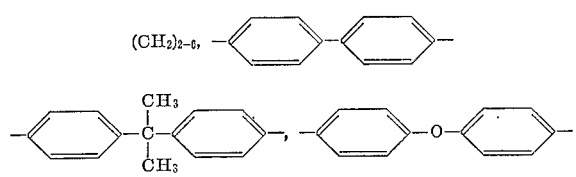

The aromatic cyanic acid esters for use according to the process of the invention can be prepared according to French Patent 1,289,079 or according to the conditions of this patent specification from divalent or polyvalent phenols and cyanogen halide at temperatures of up to 65° C. in the presence of alkalies, salts which are alkaline in reaction or tertiary amines.

Almost any polyepoxide compounds which contain more than one epoxide group per molecule are suitable for the process according to the invention and mixtures of polyepoxide compounds and monoepoxide compounds such as phenyl glycidic ether, allyl glycidic ether, phenyl glycidic ether which has been substituated by alkyl groups with 1 to 4 carbon atoms or cyclohexyl groups, or butyl glycidic ether etc. may also be used.

The polyepoxide compounds which are used may be polyglycidyl ethers of polyvalent phenols, for example those prepared from 4,4'-dihydroxydiphenylmethane, 4,4'-di-hydroxy-diphenyldimethylmethane, 4,4'-dihydroxy-diphenyl sulphone, tris-(4-hydroxyphenyl)-methane, the chlorination and bromination products of the above mentioned diphenols, hydroquinone, resorcinol and novolaks (i.e. from reaction products of mono- and polyvalent phenols with aldehydes, in particular formaldehyde, in the presence of acid catalysts), di-phenols which have been obtained by esterification of 2 mols of the sodium salt of an aromatic hydroxycarboxylic acid with 1 mol of a dihalogen alkane or dihalogen dialkyl ether (see British patent specification 1,017,612) or from polyphenols which have been obtained by condensation of phenols with long chained halogenated paraffins which contain at least two halogen atoms (see British patent specification 1,024,288).

Mention may also be made of polyepoxide compounds based on aromatic amines and epichlorohydrin, e.g. N-di-2,3-epoxypropylaniline; N,N'-dimethyl-N,N'-diepoxypropyl-4,4'-diamino-diphenylmethane; N,N'-tetraepoxypropyl-4,4'-diamino-diphenylmethane and N-diepoxypropyl-4-aminophenyl-glycidyl ether (see British patent specifications 772,830 and 816,923).

In addition, glycidyl ester of polyvalent aromatic, aliphatic and cycloaliphatic carboxylic acids may be used, for example diglycidyl phthalate, diglycidyladipate and the glycidyl esters of reaction products of 1 mol of a cyclic dicarboxylic acid anhydride and 1/2 mol of a diol of 1/n mol of a polyol with n hydroxyl groups or diglycidyl hexahydrophthalate, which compounds may be substituted by methyl groups.

Glycidyl ethers of polyhydric alcohols, for example of 1,4-butanediol, glycerol, trimethylolpropane or pentaerythritol are also suitable. Triglycidyl cyanurates, di-N,N-diepoxypropyloxamide, and polyglycidyl thioethers of polyvalent thiols, for example of bismercaptomethyl-benzene, are also useful.

Lastly, there may be mentioned the epoxidation products of poly unsaturated compounds such as vegetable oils and their conversion products, epoxidation products of di- and polyolefines such as butadiene, vinyl cyclohexene, 1,5-cyclooctadiene, 1,5,9-cyclododecatriene, polymers and copolymers which contain epoxidizable double bonds, e.g. based on polybutadiene, polyisoprene, butadiene-styrene copolymers, divinylbenzene, dicyclopentadiene or unsaturated polyesters; further, epoxidation products of olefines which are obtainable by Diels Alder addition and can be prepared e.g. by epoxidation of the following:

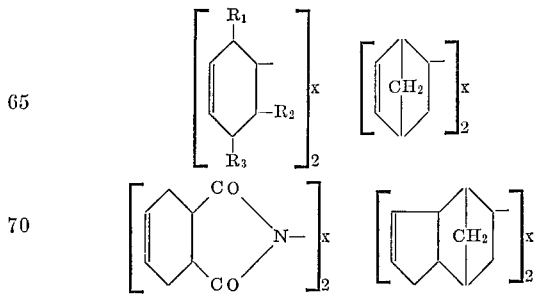

in which $x$ may represent many different bridge members such as $—O—CH_2—CH_2—O—$, or $—CH_2—OOC—$, and $R_1$, $R_2$ and $R_3$ denote hydrogen atoms, alkyl, alkenyl or carboxyalkyl groups; also, apoxidation products of polycyclic compounds which have a spiro structure, such as can be obtained e.g. by epoxidation of the following:

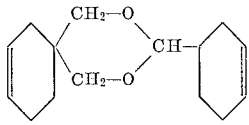

The following polyepoxide compounds are advantageously used for the process according to the invention: Polyglycidyl ethers of polyvalent phenols, in particular of bis-phenol A; polyepoxide compounds based on aromatic amines, in particular bis-(N-epoxypropyl)-aniline; N,N'-dimethyl - N,N' - diepoxypropyl - 4,4' - diamino-diphenyl-methane and N-diepoxy-propyl - 4,4' - diamino-diphenylether; polyglycidyl esters of cycloaliphatic dicarboxylic acids, in particular hexahydrophthalic acid diglycidyl esters and the polyepoxide obtained from the reaction products of 3 mols of hexahydrophthalic acid anhydride and 1 mol of trimethylolpropane; dicyclopentadiene diepoxide and 3,4-epoxyhexahydrobenzal-3',4'-epoxy-1', 1'-bis-(hydroxymethyl)-cyclohexane.

The proportions in which the aromatic cyanic acid esters are reacted with the 1,2-epoxide compounds is so chosen that there are 0.5 to 2 and preferably 0.7 to 1.4 epoxide groups per cyanic acid ester equivalent. One cyanic acid ester equivalent is understood to mean the quantity of cyanic acid ester in grams which contains one cyanic acid ester group.

This reaction may be carried out in such a way that an excess of aromatic cyanic acid ester or epoxide compound is first put into the process for forming a prepolymer and the prepolymer is subsequently further reacted with mono epoxide compound or cyanic acid ester.

The reaction of the cyanic acid ester with the epoxide compound is generally carried out by heating the components with stirring until a homogeneous liquid is obtained. This can then be poured into moulds and converted into synthetic resins at temperatures of between 0 and 250° C., preferably between 50 and 200° C. depending on the reactivity of the cyanic acid ester and of the epoxide compounds. The times required also depend on the reactivities and may vary from a few minutes to several hours.

Fillers such as ground stone, pigments, dyes, petroleum waxes and bitumens, reinforcing materials such as glass fibres of fabrics or plasticizers, as well as mixtures of the above mentioned additives may be added to the mixtures of cyanic acid esters and epoxide compound before the reaction for the purpose of influencing the properties of the moulded articles which are to be produced. In addition, other materials such as metal parts may be inserted or moulded into the moulded articles for the purpose of carrying electric currents or voltage.

The reaction of the cyanic acid esters with the epoxide compounds can also be stopped, e.g. by cooling, at a point in time at which a resin which is solid at room temperature and still soluble in solvents, such as acetone, and which can still be melted at higher temperatures or be deformed under pressure is formed. This resin may then be further reacted later under heat and pressure, if desired with fillers, dyes and reinforcing materials, for the production of the synthetic resin according to the invention in the form of moulded articles.

A solution of the cyanic acid ester and the epoxy compounds in a solvent such as acetone, methyl ethyl ketone or methyl glycol acetate can also be prepared and this solution applied either directly or after heating to various surfaces. Heating to elevated temperatures first causes the solvent to evaporate and thereafter the synthetic resins according to the invention are obtained in the form of thin films and coatings.

The solution of cyanic acid esters and epoxide compounds, previously warmed if desired, can also be used for impregnating webs of paper or fabric. These can then be worked up under heat and pressure to form pressed laminates.

The various methods described above for carrying out the reaction of cyanic acid esters with epoxide compounds lead to synthetic resins which have good mechanical and electrical properties. They show firm adhesion to various supports and have good thermal stability. In addition, they are resistant to solvents and chemicals.

Synthetic resins are understood in the present application to mean moulded articles, coverings, coatings, electrical insulating materials, impregnations, lacquers, films, moulded laminates, moulding materials, adhesions, etc.

EXAMPLE 1

100 parts by weight of 4,4'-dicyanato-diphenyl-dimethyl-methane having a cyanate equivalent weight of 139 were mixed with 132 parts by weight of diglycidyl hexahydrophthalate having an epoxide equivalent weight of 170 at 80° C., a homogeneous liquid being formed as a result. This was poured into a metal mould treated with a mould parting agent, which mould was then kept in a heating cupboard at 120° C. for 6 hours and then at 180° C. for 24 hours. On removal from the mould, a moulded synthetic resin was obtained which was transparent and of yellowish-brown colour and which was found to have the following properties:

Impact strength kg. wt. cm./cm.$^2$ _____ 15.1
Hot dimensional stability in Martens ° C. _____ 182
Bending resistance kg. wt./cm.$^2$ _____ 1350

EXAMPLE 2

100 parts by weight of the dicyanic acid ester mentioned in Example 1 was treated in the same way as in Example 1 instead of diglycidyl hexahydrophthalate with 116 parts by weight of 3,4-epoxy-hydrobenzal-3',4'-epoxy-1',1'-bis (hydroxymethyl)-cyclohexane which has an epoxide equivalent weight of 162 and which is described in Example 1 of French patent specification 1,233,231. The properties of the resulting plastics moulding were as follows:

Impact strength kg. wt. cm./cm.$^2$ _____ 9.7
Bending resistance kg. wt./cm.$^2$ _____ 1280
Hot dimensional stability in Martens ° C. _____ 217

EXAMPLE 3

100 parts by weight of 1,4-dicyanatobenzene of cyanate equivalent weight 80 were stirred at 100° C. with 232 parts by weight of 4,4'-bis-(2,3-epoxy-propoxy-diphenyl)-dimethylmethane which had an epoxide equivalent weight of 190 and which had been prepared from 232 parts by weight of 4,4'-dihydroxy-diphenyl-dimethylmethane and epichlorohydrin, to form a homogeneous liquid. The procedure was otherwise the same as described in Example 1. The properties of the synthetic mouldings obtained were as follows:

Impact strength kg. wt. cm./cm.$^2$ _____ 18.5
Bending resistance kg. wt./cm.$^2$ _____ 1385
Hot dimensional stability in Martens ° C. _____ 160

EXAMPLE 4

100 parts by weight of 4,4'-dicyanato-diphenylsulphone which had a cyanate equivalent weight of 150 and 250 parts by weight of an epoxide compound which had an epoxide equivalent weight of 380 and which had been prepared from 4,4'-dihydroxy-diphenyl-dimethylmethane and epichlorohydrin were dissolved in 300 parts by weight of ethyl glycol acetate at 80° C. The solution was poured out onto iron sheets which were heated for 10 minutes at 120° C. and 15 minutes at 180° C. Brownish yellow lacquer coatings were obtained which had great hardness and adhesive strength at room temperature and at 180° C.

EXAMPLE 5

100 parts by weight of a polycyanic acid ester which had been obtained by reacting chlorocyanogen with a novolak which had been prepared from phenol and formaldehyde in the molar ratio of 1:1, which polycyanic acid ester had a cyanate equivalent of 132, were dissolved, together with 144 parts by weight of the epoxide compound mentioned in Example 3, in 250 parts by weight of a mixture of acetone/benzene 1:1. Webs of glass fabric were dipped into the solution and after 15 minutes at room temperature they were stored in a hot air oven at 120° C. for 20 minutes.

The impregnated glass fabrics obtained in this way (prepregs) were placed in several layers over each other and pressed in a heated press at 160° C. at a pressure of 30 kg. wt./cm.². A sound proof laminate was obtained which was found to have the following properties:

| | |
|---|---|
| Impact strength kg. wt. cm./cm.² | 50 |
| Bending resistance kg. wt./cm.² | 3200 |
| Hot dimensional stability in Martens ° C. | 250 |

EXAMPLE 6

100 parts by weight of 4,4'-dicyanato-diphenyl-dimethylmethane which has a cyanate equivalent weight of 139 are mixed with 135 parts by weight of a 4,4'-(2,3-epoxypropyl-diphenyl)-dimethylmethane which has been prepared from 4,4'-dihydroxy-diphenyl-dimethylmethane and epichlorohydrin and which has an epoxide equivalent of 190 to 90° C., to form a homogeneous melt. The melt is then heated at 150° C. for 3 hours and again cooled to room temperature. A highly viscous liquid which represents an intermediate state in the formation of the synthetic resin and is very suitable for laminating glass fabrics is obtained.

A plate 4 mm. in thickness is laminated in a pressure mould from a glass fabric with linen weave and aminosilane finish, and the laminate is hardened overnight at 150° C. After removal from the mould and 3 hours tempering at 180° C., the moulding obtained has the following values:

| | |
|---|---|
| Tensile strength kg. wt./cm.² | 2210 |
| Bending resistance kg. wt./cm.² | 3310 |
| Compression strength kg. wt./cm.² | 2250 |
| Hot dimensional stability according to Martens, ° C. | 250 |

EXAMPLE 7

100 parts by weight of 4,4'-dicyanato-diphenyl-dimethylmethane which has a cyanate equivalent of 139 are mixed with 85 parts by weight of an epoxide compound which has been prepared from aniline and epichlorohydrin and has an epoxy equivalent of 120 at 90° C., to form a homogeneous melt. The liquid is then poured into a metal mould lines with mould parting agent, and is kept overnight in a crying cupboard at 150° C. After removal from the mould, a transparent plate of synthetic resin is obtained which is found to have the following mechanical values:

| | |
|---|---|
| Impact strength kg. wt. cm./cm.² | 8.9 |
| Bending resistance kg. wt./cm.² | 1170 |
| Hot dimensional stability according to Martens ° C. | 109 |

EXAMPLE 8

100 parts by weight of an epoxide compound which has been prepared from 4,4'-dihydroxy-diphenyl-dimethylmethane and epichlorohydrin and which has an epoxide equivalent weight of 3000 and 6 parts by weight of 1,3-dicyanatobenzene are dissolved in a mixture of ethyl glycol acetate and methyl ethyl ketone (ratio of mixture 1:1). The solution has a solid content of 35% by weight. Part of the solution is applied to iron sheets which had been heated at 80° C. for 30 minutes and at 120° C. for 5 minutes. The sheets are then placed together with the treated surfaces in contact and are heated under pressure for 30 minutes at 180° C. After cooling, a very firm adhesive bond between the iron sheets is obtained. The joint formed by the adhesive at the same time provides good electrical insulation and prevents penetration of moisture between the sheets.

What is claimed is:

1. A process for producing a synthetic resin which comprises reacting (a) a 1,2-epoxide compound having more than one 1,2-epoxide group per molecule selected from the group consisting of polyglycidyl ethers of polyvalent phenols; 1,2-polyepoxides of aromatic amines and epichlorohydrin; glycidyl esters of polyvalent aromatic, aliphatic or cycloaliphatic carboxylic acids; glycidyl ethers of polyhydric alcohols; triglycidyl cyanurates; polyglycidyl thioethers of polyvalent thiols and epoxidation products of polyunsaturated compounds with (b) an aromatic cyanic acid ester having at least two cyanic acid ester groups attached to an aromatic nucleus thereof.

2. The process of claim 1 wherein (b) is of the formula $$R(O—C≡N)_n$$

wherein $n$ is an integer of at least 2 and R is an aromatic radical which may be connected by bridge members.

3. The process of claim 6 wherein said reaction is carried out at a temperature between 0 and 250° C.

4. The process of claim 1 wherein (a) and (b) are reacted in such proportions that 0.5 to 2 epoxide groups are available for each cyanate group.

5. A synthetic resin consisting substantially of reaction products of 0.5 to 2 equivalents, based on the epoxide groups, of (a) a 1,2-epoxide compound having more than one 1,2-epoxide group per molecule selected from the group consisting of polyglycidyl ethers of polyvalent phenols; 1,2-polyepoxides of aromatic amines and epichlorohydrin; glycidyl esters of polyvalent aromatic, aliphatic or cycloaliphatic carboxylic acids; glycidyl ethers of polyhydric alcohols; triglycidyl cyanurates; polyglycidyl thioethers of polyvalent thiols and epoxidation products of polyunsaturated compounds and one equivalent, based on the cyanic acid ester groups, of (b) an aromatic cyanic acid ester having at least two cyanic acid ester groups attached to an aromatic nucleus thereof.

6. The synthetic resin of claim 5 wherein said (b) is of the formula:

$$R(O—C≡N)_n$$

wherein $n$ is a integer of at least 2 and R is an aromatic radical which may be connected by bridge members.

References Cited
UNITED STATES PATENTS

| | | | |
|---|---|---|---|
| 2,753,323 | 7/1956 | Farnham | 260—47EpCN |
| 2,996,517 | 8/1961 | Leech et al. | 260—47EpCN |

HAROLD D. ANDERSON, Primary Examiner

T. E. PERTILLA, Assistant Examiner

U.S. Cl. X.R.

117—161; 161—184; 260—2, 18, 28, 29.1, 37, 59, 79, 88.3, 830